United States Patent [19]

Wirth et al.

[11] Patent Number: 5,410,791
[45] Date of Patent: May 2, 1995

[54] FABRICATION CHUCK

[75] Inventors: Reinhold F. Wirth, Ballston Spa; Stanley J. Lubowski, Scotia, both of N.Y.

[73] Assignee: General Electric Company, Schenectady, N.Y.

[21] Appl. No.: 84,115

[22] Filed: Jul. 1, 1993

[51] Int. Cl.⁶ .................................... B23P 19/02
[52] U.S. Cl. ............................ 29/235; 269/21
[58] Field of Search ............. 29/235, 281.1; 269/20, 269/21, 22; 279/3; 51/235

[56] References Cited

U.S. PATENT DOCUMENTS

| | | | |
|---|---|---|---|
| 3,294,392 | 12/1966 | Dunlam | 269/21 |
| 3,554,834 | 7/1968 | Bennett et al. | |
| 3,598,006 | 8/1971 | Gerber et al. | 269/21 |
| 3,818,823 | 6/1974 | Bond | |
| 4,543,862 | 10/1985 | Levene et al. | 269/21 |
| 4,700,474 | 10/1987 | Choinski | |
| 4,720,426 | 1/1988 | Englert et al. | |
| 5,125,994 | 6/1992 | Harasta et al. | |
| 5,132,539 | 7/1992 | Kwasnick et al. | |
| 5,153,438 | 10/1992 | Kingsley et al. | |
| 5,187,369 | 2/1993 | Kingsley et al. | |
| 5,201,981 | 4/1993 | Whiteside | |
| 5,208,460 | 5/1993 | Rougeot et al. | |
| 5,316,607 | 5/1994 | Johnsen et al. | |
| 5,322,719 | 6/1994 | Westling et al. | 269/21 |

FOREIGN PATENT DOCUMENTS

| | | |
|---|---|---|
| 4073602 | 3/1992 | European Pat. Off. |
| 0500202 | 8/1992 | European Pat. Off. |
| 3507667 | 8/1987 | Germany |
| 8618218 | 3/1988 | Germany |
| 3706443 | 9/1988 | Germany |
| 9006224 | 6/1990 | WIPO |

*Primary Examiner*—Robert C. Watson
*Attorney, Agent, or Firm*—Donald S. Ingraham; Marvin Snyder

[57] ABSTRACT

A fabrication chuck for applying a thin membrane to the irregularly-shaped surface of a workpiece includes a foundation adapted to hold the workpiece in a selected fabrication position and an upper chuck assembly adapted to be fastened to the foundation. The upper chuck assembly includes an applicator that is moveably mounted so that it can be displaced towards the workpiece in the assembly chamber. The applicator has a mating surface and is adapted to selectively retain the thin membrane on the mating surface until the applicator is disposed in a position so that the thin membrane can be released and deposited in a desired position on the workpiece. The foundation is adapted to generate a differential pressure across the workpiece and the thin membrane so as to draw the thin membrane down over the workpiece so that it is in conformal contact with the irregularly-shaped surface.

10 Claims, 2 Drawing Sheets

FABRICATION CHUCK

RELATED APPLICATIONS

This application is related to the application by the inventors herein entitled "Conformal Deposition of Thin Membranes on Irregularly-Shaped Surfaces and Devices Formed Thereby", Ser. No. 08/084,111, now continuation-in-part application Ser. No. 08/330,642, filed 28 Oct. 1994, assigned to the assignee of the present invention and which is incorporated herein by reference.

BACKGROUND OF THE INVENTION

In a number of devices, such as radiation imagers, it is desirable to apply a thin membrane to an irregularly shaped surface. For example, in a radiation imager in which a scintillator is optically coupled to a photosensor, it is desirable to apply a layer of reflective material to the surface of the scintillator opposite the surface adjoining the photodetector so that optical photons generated in the scintillator are reflected towards the photosensor. Commonly, one surface of the scintillator is irregularly shaped, that is, protrusions extend from the surface so that the surface is not flat. Such protrusions are needle or pyramid-like structures that result from the deposition process and serve to localize detection of photons generated in the array to the area in which the incident radiation was absorbed in the scintillator.

Application of reflective coatings to the irregular surface of the scintillator poses a number of difficulties. Many scintillator materials, such as cesium iodide, have large thermal expansion coefficients and thus are extremely sensitive to processes in which a reflective coating is deposited onto the surface, such as by sputtering. The relatively high temperatures associated with such deposition processes (e.g., above about 300°–400° C.) cause cracks in the scintillator material that create optical discontinuities and thus degrade scintillator performance.

For example, a reflective coating on a scintillator surface desirably significantly increases the number of optical photons detected by the photosensor as compared with an arrangement in which the scintillator has no reflective coating (e.g., an increase of at least one-third or more in optical photons captured is desirable). Further, the reflective coating should conform to the irregular shape of the scintillator so that optical photons are directly coupled between the reflective layer and the scintillator material, with few if any interstitial voids between the scintillator material and the reflective material. Additionally, the application of the reflective material should not degrade the scintillator structure, either by thermally degrading the material or mechanically deforming the needle or pyramid-like structure of the scintillator. Reflective materials having the desired optical and physical characteristics are available in monolithic thin membranes (as used herein, "monolithic" refers to a substantially uniform material in a sheet-like form), however application of such thin membranes to the irregular shaped surfaces of a scintillator without damaging the scintillator or the thin membrane has been problematic.

The monolithic thin membranes used to cover a scintillator and other optical components are typically quite thin (e.g., about 0.060" or less) and difficult to apply without damaging (e.g., tearing or bunching together) the thin membrane, or damaging the irregular surface to which it is applied (e.g., deforming some of the protrusions on the surface).

Conformal deposition of relatively thin membranes (or films) to irregularly shaped surfaces also has applicability in liquid crystal device fabrication and application of optical coatings to components such as lenses, reflectors, and the like.

It is thus an object of this invention to provide a device for depositing a thin membrane over an irregular shaped surface so that the membrane conforms to the irregular surface.

A further object of this invention is to provide a device for fabricating an imager having a thin membrane reflective coating disposed over a scintillator having an irregularly-shaped surface.

A still further object of this invention is to provide a device for disposing a thin membrane in a desired position with respect to a workpiece such that the membrane is precisely laterally aligned with the workpiece.

SUMMARY OF THE INVENTION

In accordance with this invention, vacuum fabrication chuck for applying a thin membrane to an irregularly-shaped surface of a workpiece comprises a foundation adapted to hold the workpiece in a selected fabrication position and an upper chuck assembly that is adapted to be detachably fastened to and hermetically sealed to the foundation so as to form an assembly chamber therebetween. The upper chuck assembly comprises an applicator moveably mounted in the upper chuck assembly and adapted to be selectively displaced towards the workpiece; the applicator includes a mating surface adapted to releasably retain the thin membrane for positioning the membrane with respect to the workpiece. The fabrication chuck further comprises means to selectively displace the the applicator in a desired position in the assembly chamber with respect to the workpiece, such as by generating a differential pressure between the interior and the exterior of the assembly chamber, and means for drawing the thin membrane down over the irregularly shaped surface of the workpiece, such as by generating a differential pressure across the workpiece (with the thin membrane disposed thereover) such that the thin membrane is drawn into conformal contact with the irregularly-shaped surface. Vacuum piping selectively coupled to a vacuum source or a vent via a valve is used to generate the differential pressures.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
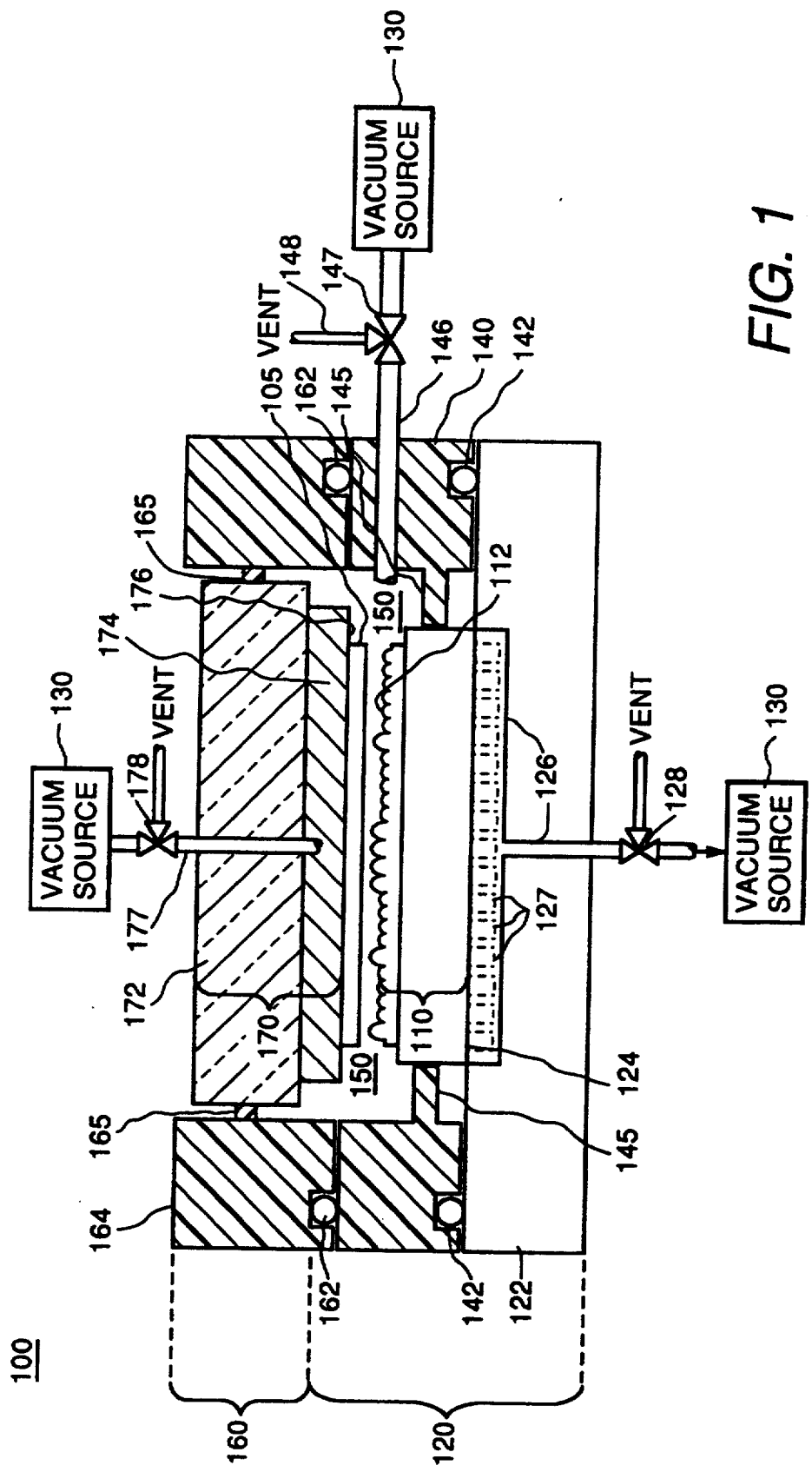
FIG. 1 is a cross-sectional diagram of a fabrication chuck in accordance with the present invention.

A fabrication chuck 100 in accordance with the present invention comprises a foundation 120 and an upper chuck assembly 160, which is detachably fastened to foundation 120. In accordance with this invention a relatively thin membrane 105 can be disposed on an irregular surface 112 of a workpiece 110 so as to conform to the irregular shape of the surface. As used herein, "membrane" refers to porous and non-porous materials that are typically monolithic, that is in substantially one piece, such as a sheet of material, and that are typically pliant (including materials that are semi-rigid); "relatively thin" refers to materials having a thickness of between about 0.0005" and 0.060"; "irregular surface" refers to a surface having protrusions extending therefrom (alternatively, the surface may be thought of as having depressions therein) such that it is not smooth; and "conformingly dispose" and the like refers to the deposition of material around the protuberances (or depressions) in the surface such that the applied material is in substantially immediate contact with at least a desired portion of the irregular surface so that there are substantially no interstitial voids between the surface and the applied material.

Foundation 120 comprises a base 122 that is adapted such that a vacuum can be drawn across workpiece 110 disposed on an interior surface 124 of base 122. For example, vacuum piping (or plumbing) 126 is disposed in base 122 and coupled to orifices 127 on interior surface 124. Piping 126 is further coupled via a control valve 128 to a vacuum source 130 and thus provides means to create a differential pressure across irregular surface 112 by evacuating (e.g., reducing the ambient pressure in the area of) the underside of workpiece 110. Orifices 127 are typically disposed across a portion of interior surface 124 corresponding to the area of workpiece 110 such that the differential pressure generated is substantially uniform across the area of the workpiece. Control valve 128 typically comprises a 3-way valve that is also coupled to a vent disposed in plumbing 126 to allow equalization of pressure across workpiece 110 when desired. Alternatively, two separate valves, one for coupling to the vacuum source, and one for venting, can be used.

As illustrated in FIG. 1, foundation 120 further comprises a registration assembly 140 that is detachably coupled to base 122, for example by fasteners such as latches, clamps, screws, bolts and nuts, or the like (not shown) such that it is removable from base 122 but can be firmly attached to base 122. A seal 142, such as an O-ring, is disposed between registration assembly 140 and base 122 such that, when coupled together, the base and the registration assembly are hermetically joined. As used herein, "hermetically joined", "hermetically sealed" or the like refers to a seal that is substantially air-tight and allows a differential pressure to be generated across the sealed boundary.

Registration assembly 140 further comprises registration guides 145 which are adapted to align workpiece 110 in a selected position with respect to base 122 and consequently with respect to upper chuck assembly 160, on which thin membrane 105 is disposed as described more fully below. As illustrated in FIG. 1, registration guides 145 comprise fingers extending from registration assembly 140; alternatively the registration scheme may comprise grooves or indentations in registration assembly 140 adapted to receive and align workpiece 110 in a desired fabrication position, that is the position on interior surface 124 in which the workpiece is situated to receive the thin membrane from applicator an 170 as described more fully below.

In accordance with this invention, base 122 is adapted such that different registration assemblies 140 can be attached (one at a time) to the base, thus allowing registration assemblies tailored for alignment of different size workpieces to be respectively attached to base 122. Alternatively, base 122 and registration assembly 140 may comprise a single assembly (that is, registration assembly 140 is not detachable from base 122). The base and registration assembly typically comprise a metal such as a stainless steel or the like or a composite material having sufficient strength and rigidity to withstand the differential pressures as described below.

Registration assembly typically further comprises vacuum port 146 coupled to vacuum source 130 via a control valve 147, which is typically a 3-way valve that is adapted to be coupled to a vent port and a vent port 148 so as to equalize pressure across the walls of registration assembly 140. Two separate valves can be used in lieu of a 3-way valve. Vacuum source 130 comprises a vacuum pump or the like, with the amount of vacuum available being design considerations dependent on the size of the fabrication chuck; for a fabrication chuck for applying optical cladding layers to a scintillator as described herein, a vacuum source providing up to about 20" Hg is satisfactory.

Upper chuck assembly 160 is adapted to be hermetically sealed to registration assembly 140 so as to form an assembly chamber 150 therebetween. A seal 162, such as an O-ring, is disposed between upper chuck assembly 160 and registration assembly 140 to hermetically seal the juncture where the two assemblies are joined together.

Upper chuck assembly 160 comprises a frame 164 and an applicator 170 positioned within frame 164 by means of a flexible joint 165 such that applicator 170 is adapted to be selectively displaced towards workpiece 110 in assembly chamber 150. Upper chuck assembly 160 is adapted so that displacement of applicator towards workpiece 110 is along a predetermined axis so that thin membrane 105 is precisely laterally aligned with workpiece 110; the precise lateral alignment is possible as workpiece 110 is disposed in a known, selected position with respect to applicator 170 when it is positioned in registration assembly 140 and upper chuck assembly 160 is fastened to foundation 120 to form the fabrication chuck. As used herein, "lateral alignment" refers to the positioning of the thin membrane over the workpiece such that it is aligned with respect to the workpiece in the plane of the membrane/workpiece. For example, flexible joints 165 are adapted to allow movement of applicator 170 along the sidewalls of frame 164 so that the alignment of the applicator within frame 164 is maintained. Applicator 170 comprises a vacuum chuck 172 having a mating surface 174 disposed facing assembly chamber 150. Mating surface 174 typically comprises a layer of sintered material, such as stainless steel, a composite, or the like, with a smooth planar surface 176. As used herein, "sintered material" refers to a smooth-faced material having fine pores therein to allow the passage of gas therethrough; the size of the pores can range between 0.5 μm and 100 μm, although typically the pore size is about 10 μm or less.

Upper chuck assembly 160 further comprises vacuum plumbing 177 connected to vacuum source 130 via a control valve 178 (typically comprising a 3-way valve) and adapted to generate a differential pressure by taking a suction through the sintered material comprising mating surface 174. Control valve 178 is further connected to vent plumbing 179 to allow equalization of pressure across mating surface 176. Applicator 170 typically comprises a substantially transparent material such as a polymer or the like to allow visual inspection of the assembly chamber. Alternatively or additionally, viewing ports are disposed in foundation 120 and upper chuck assembly 160 to allow visual determination of the position of applicator 170 with respect to workpiece 110.

Figure 2A:
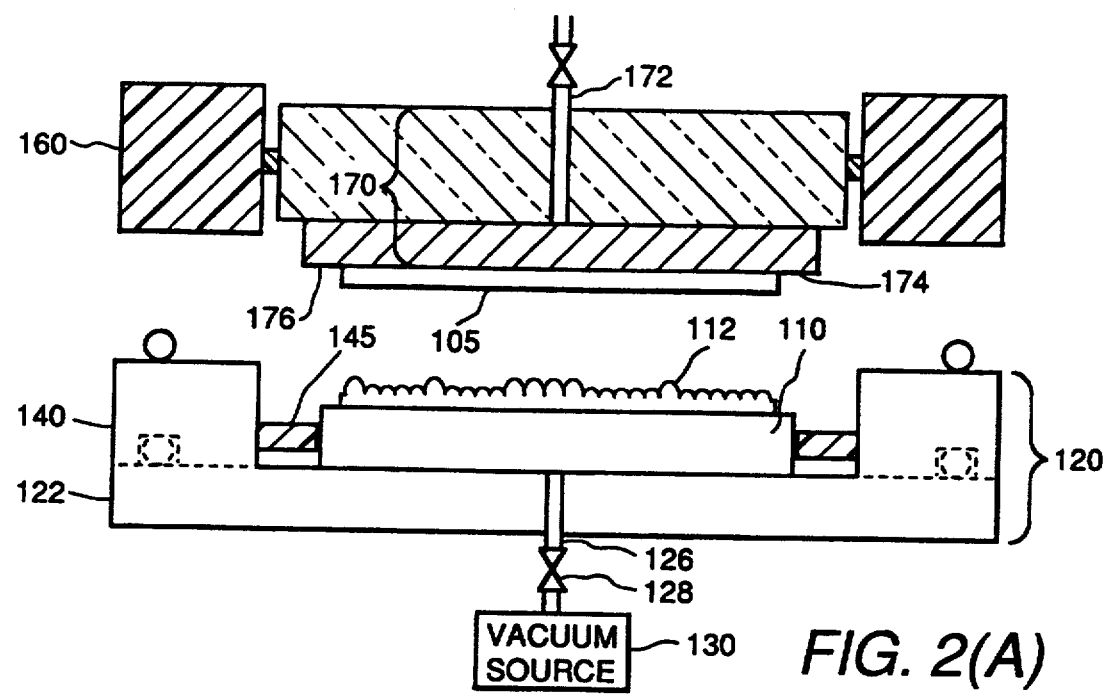
FIGS. 2(A)–2(C) are cross-sectional views illustrating certain steps in the application of a thin membrane illustrating the operation of the fabrication chuck of the present invention.
Figure 2B:
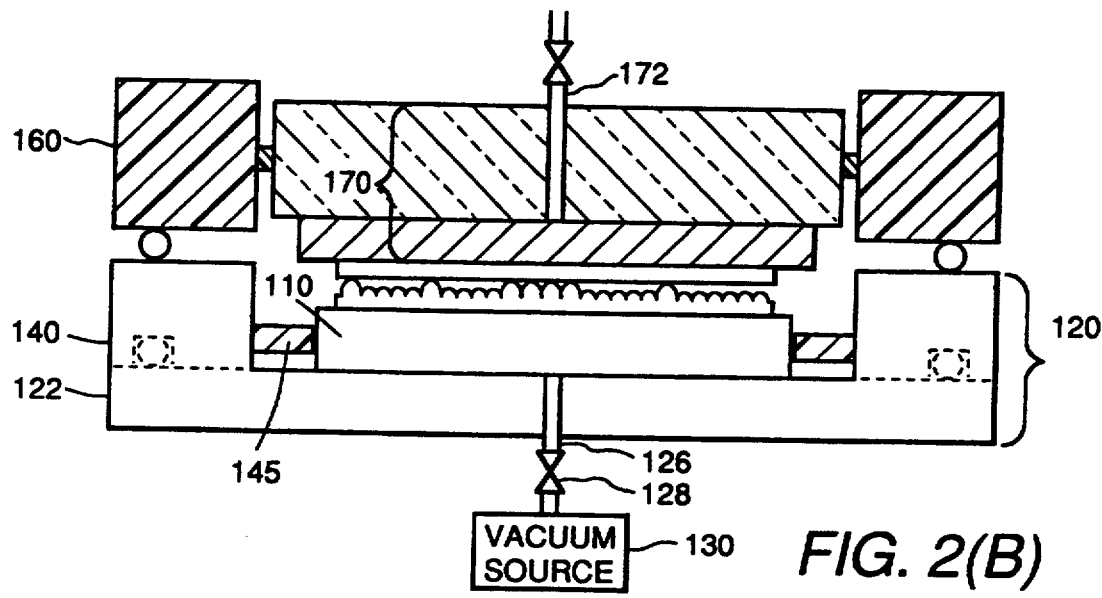
Figure 2C:
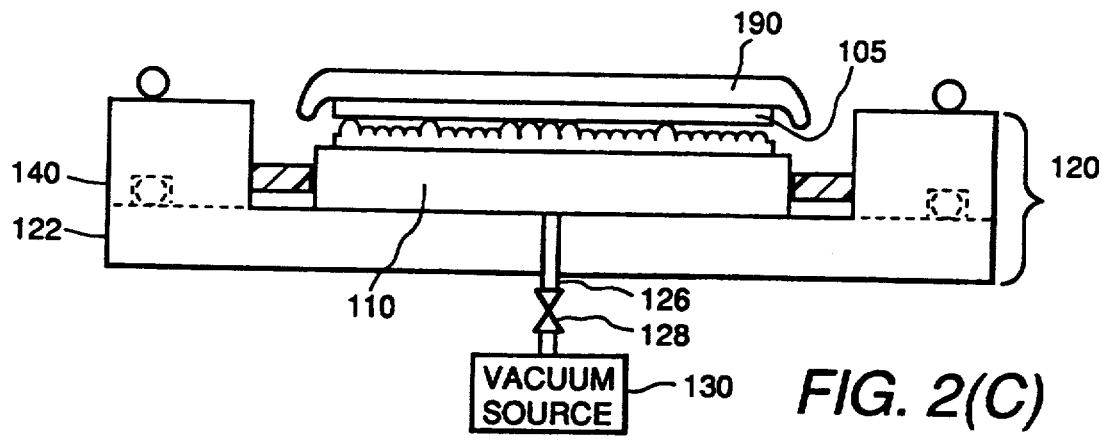

Operation of the vacuum fabrication chuck of the present invention is illustrated in FIGS. 2(A)-2(C). Thin membrane 105 is applied to irregular surface 112 of workpiece 110 as set out below. A registration assembly appropriate for the workpiece to be processed is selected and coupled to base 122 to form foundation 120 having the desired alignment dimensions. Workpiece 110 fits in registration assembly 140 such that it is disposed in a selected position in the foundation. For example, registration assembly 140 is selected such that registration guides 145 are disposed to align workpiece 110 in the selected position in the foundation, typically substantially centered on the face of interior surface 124 of base 122 on which it rests and such that irregular surface 112 is disposed in a position so that the flexible membrane can be disposed thereon. Workpiece 120 typically comprises an imager array having a substrate with a photosensor array and a scintillator disposed thereover. Irregular surface 112 of the scintillator typically comprises a number of needles or pyramid-like protrusions from the surface over which it is desired to deposit a conformal reflective layer.

Thin membrane 105, such as a thin film of reflective material or the like, is shaped into a monolithic sheet of material having dimensions substantially corresponding to the dimensions of the area of irregular surface 112 to which it is to be applied. Thin membrane 105 typically comprises a sheet of material that is disposed over smooth planar surface 176 of mating surface 174 and aligned in correspondence with registration guides so as to have a desired alignment with respect to workpiece 110 when the upper chuck assembly 160 is coupled to foundation 120.

In accordance with this invention, thin sheet 105 is held in the desired alignment with respect to mating surface 174 by generating a differential pressure across the thin membrane so that it it is held on smooth planar surface 176. For example, vacuum plumbing 177 is coupled to vacuum source 130 so as to evacuate mating surface 174 and thereby allow ambient pressure to hold thin membrane 105 against mating surface 174. As the pores in the sintered material comprising mating surface 174 are relatively small (e.g., between about 0.5 μm and 10 μm), thin membrane 105 maintains a relatively flat shape, that is, the differential pressure across the thin membrane is relatively uniform and the thin membrane is not deformed.

In imager array fabrication, thin membrane 105 typically comprises an optical reflector to be applied to irregular surface 112 of the scintillator material on the array. The multilayer optical reflector comprising thin membrane 105 typically comprises an adhesive layer (which is disposed away from mating surface 174) and an optical reflecting layer; one example of such a material (known as "Opticlad") has an adhesive layer with titanium oxide mixed therein to provide a diffuse reflector and a specular reflector, such as silver, gold, or the like, on a plastic backing, and which is described more fully in U.S. Pat. No. 4,720,426 of Englert et al., which is assigned to the assignee of the present invention and is incorporated herein by reference. The presence of the diffuse reflector layer (i.e, the adhesive material mixed with $TiO_2$) provides improved optical performance over a specular-only reflector layer. The thickness of the adhesive/diffuse reflector layer in Opticlad is about 5 μm and the silver and plastic reflector layer has a thickness of about 2 mils.

Upper chuck assembly is disposed in foundation 120 so as to form assembly chamber 150 therebetween, for example as illustrated in FIG. 1. Flexible joints 165 are adapted to hermetically seal assembly chamber 150 and to allow applicator 170 to be displaced towards (and away from) workpiece 110. In accordance with this invention, applicator 170 is selectively displaced such that thin membrane 105 is disposed in a desired position with respect to the irregular surface of workpiece 110. As used herein, desired position refers to positioning the thin membrane so that portions of it are in physical contact with at least some of the protrusions from the irregular surface of the workpiece, without causing damage or deformation of such protrusions, and so that the thin membrane is in a position to be drawn into conformal contact with the irregular surface in accordance with this invention as described below. The desired position also reflects the precise lateral alignment of the thin membrane to the workpiece surface. The precise lateral alignment further allows the application of a thin membrane having a tacky or adhesive surface that will begin to bond to the workpiece when it comes in contact with the surface (the tacky surface makes it impractical to move the thin membrane laterally across the irregular surface after initial contact is made between the thin membrane and the workpiece).

Displacement of applicator 170 is typically controlled by applying a differential pressure across the applicator, for example by lowering the pressure in assembly chamber 150 by selectively controlling vacuum control valve 147 in vacuum piping 146 coupled to vacuum source 130 (FIG. 1). The differential pressure causes displacement of applicator 170 towards workpiece 110 to allow disposing thin membrane in the desired position with workpiece 110, as illustrated in FIG. 2(B). Alternatively, pneumatic devices (such as pistons coupled to the applicator), electrical devices (such as electromechanical motor/operator arrangements) or manual displacement can be used. Determination of placement of thin membrane 110 in the desired position may be made visually, for example by viewing the applicator and workpiece through substantially transparent portions of the fabrication chuck assembly; alternatively other optical (e.g., a laser alignment system) or electrical sensors can be used to assist in disposing the thin membrane in the desired position.

After thin membrane 105 is disposed in the desired position on irregular surface 112 of workpiece 110, it is released from mating surface 174 by equalizing the pressure across the thin membrane such that it is no longer held against mating surface 174. Equalizing the pressure is accomplished by isolating vacuum source 130 from vacuum piping 177 and positioning control valve 178 to the vent position. The differential pressure disposing applicator 170 towards workpiece 110 is released and applicator is then moved away from workpiece 110 and can be removed from foundation 120, the motive force for such movement being pneumatic, electrical, manual, or the like. The entire upper chuck assembly 160 can be removed from foundation 120.

As illustrated in FIG. 2(C), thin membrane 105 is then drawn down into conformal contact with irregular surface 112 of workpiece 110. As used herein, "drawn down" refers to causing the thin membrane to partially deform around protrusions extending from irregular surface 112 such that the membrane material substantially conforms to the irregular features of the surface. Thin membrane 105 is typically drawn down over irregular surface 112 by applying a differential pressure across thin membrane 105 so as to urge it into conformal contact with irregular surface 112. The differential pressure to draw down the thin membrane is generated by coupling vacuum piping 126 to vacuum source 130 such that ambient pressure under and within workpiece 110 is reduced, resulting in a differential pressure on thin membrane 105 that forces it into conformal contact with irregular surface 112. The amount of differential pressure applied is controlled with vacuum control valve 128. Further, to avoid damaging thin membrane, a protective blanket 190 can be disposed over thin membrane 105. Protective blanket 190 is adapted to transfer the applied differential pressure such that the pressure is applied to thin membrane substantially uniformly to enhance conforming thin membrane 105 to the irregular surface.

As noted above, thin membrane 105, such as an optical cladding used on a scintillator, typically comprises an adhesive layer disposed toward the irregular surface so that thin membrane bonds to the irregular surface. After thin membrane is drawn into conformal contact with the irregular surface of workpiece 110, protective blanket 190 is removed and the workpiece is further processed to allow curing of the thin membrane adhesive and application of other components. In the case of imagers, such as radiation imagers, such further components may include protective sheets of aluminum or the like disposed over the array as a sealant layer to provide additional protection to the array, such as to seal it from moisture or damage from physical handling. The fabrication chuck and method in accordance with this invention can similarly be used for application of such components.

Imager arrays having a thin membrane optical reflecting layer conforming to the irregular surface (e.g., protrusions of about 10 μm or less) of the scintillator in accordance with this invention exhibit improved performance over scintillators having no reflective coating or a reflective coating that is deposited directly on the scintillator by a method such as sputtering or the like. For example, an array fabricated in accordance with this invention has been shown to detect in the photosensor array about 45% more of optical photons generated in the scintillator than a similar photosensor array coupled to a scintillator without a reflective coating.

The fabrication chuck of this invention is thus advantageously used in the application of thin membranes, e.g., membranes that are not readily manually manipulated or placed, in precise lateral alignment on workpieces having irregular shaped surface features such that the thin membrane is conformably disposed over the workpiece surface.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A vacuum fabrication chuck for applying a thin membrane to an irregularly-shaped surface of a workpiece without causing deformation of protrusions from the surface of the workpiece, comprising:

a foundation adapted to hold said workpiece in a selected workpiece fabrication position;

an upper chuck assembly adapted to be detachably mounted to said foundation such that an assembly chamber is formed therebetween, said upper chuck assembly further comprising a frame and a moveable applicator disposed therein said applicator having a substantially flat mating surface disposed towards said assembly chamber and adapted to retain said thin membrane on said mating surface, said applicator further being adapted to selectively release said thin membrane from said mating surface, said applicator being displaceable within said assembly chamber to be disposed in close proximity to said workpiece and laterally aligned with registration guides to dispose said thin membrane on said workpiece whereby said membrane can be selectively disposed in a desired position over said irregularly-shaped surface of said workpiece;

said fabrication chuck further comprising vacuum piping coupled to said applicator mating surface so as to selectively draw suction through a porous material disposed on said mating surface said fabrication chuck also comprising vacuum piping coupled to said foundation so as to selectively draw a suction on the interior of said assembly chamber in which said workpiece is disposed.

2. The fabrication chuck of claim 1 wherein said applicator comprises a substantially transparent material.

3. The fabrication chuck of claim 1 wherein said foundation comprises a base portion and a registration frame assembly, said registration frame assembly comprising said registration guides; said registration frame assembly being detachably fastened to and hermetically sealed to said base portion.

4. The fabrication chuck of claim 3 wherein said said vacuum piping comprises a valve disposed to selectively control the differential pressure between the interior of said assembly chamber and the exterior of said assembly chamber whereby the disposition of said applicator towards said workpiece is controlled.

5. The fabrication chuck assembly of claim 4 further comprising a hermetic seal disposed between said upper chuck assembly and said foundation.

6. The fabrication chuck of claim 5 wherein said hermetic seal comprises an O-ring.

7. The fabrication chuck of claim 1 further comprising means for selectively displacing said applicator in a desired position in said assembly chamber with respect to said workpiece, said means being selected from the group comprising pneumatic devices, electrical devices, manual devices, and vacuum devices.

8. The fabrication chuck of claim 3 comprising a plurality of registration frame assemblies, said base portion being adapted to be fastened to one selected registration assembly at a time, each of said registration assemblies having registration guides adapted to position a workpiece of a selected size in said selected fabrication position.

9. The fabrication chuck of claim 8 wherein said chuck comprises substantially transparent portions adapted to enable visual determination of the displacement of said applicator with respect to said workpiece.

10. The fabrication chuck of claim 9 wherein said applicator is adapted to releasably retain a thin membrane having a thickness of about 0.060" or less.

* * * * *